United States Patent
Nachtegall et al.

(10) Patent No.: US 9,967,522 B2
(45) Date of Patent: May 8, 2018

(54) DRIVER MONITORING CAMERA SYSTEM

(71) Applicant: GM Global Technology Operations LLC, Detroit, MI (US)

(72) Inventors: Debbie E. Nachtegall, Rochester Hills, MI (US); Eric L. Raphael, Birmingham, MI (US); Frank J. Jobak, East China, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1113 days.

(21) Appl. No.: 13/779,044

(22) Filed: Feb. 27, 2013

(65) Prior Publication Data

US 2014/0240478 A1    Aug. 28, 2014

(51) Int. Cl.
| | |
|---|---|
| *H04N 7/18* | (2006.01) |
| *B60K 28/06* | (2006.01) |
| *G06K 9/00* | (2006.01) |
| *G08B 21/06* | (2006.01) |

(52) U.S. Cl.
CPC ............... *H04N 7/18* (2013.01); *B60K 28/06* (2013.01); *G06K 9/00845* (2013.01); *B60W 2420/403* (2013.01); *G08B 21/06* (2013.01)

(58) Field of Classification Search
CPC .......... H04N 7/18; B60K 28/02; B60K 28/06; G06K 9/00362; G06K 9/00832; G08B 21/06; B60W 2420/403
USPC ........................................................ 348/77
See application file for complete search history.

(56) References Cited

U.S. PATENT DOCUMENTS

| | | | | |
|---|---|---|---|---|
| 4,993,826 | A * | 2/1991 | Yoder, Jr. ...................... | 351/212 |
| 5,107,851 | A * | 4/1992 | Yano et al. .................... | 600/405 |
| 5,471,261 | A * | 11/1995 | Yoshizo et al. ............... | 351/210 |
| 6,658,140 | B1 * | 12/2003 | Hillmann et al. ............. | 382/127 |
| 8,676,450 | B2 * | 3/2014 | Kohara ............................ | 701/49 |
| 2002/0097377 | A1 * | 7/2002 | Kudryashov et al. ......... | 351/206 |
| 2008/0002046 | A1 * | 1/2008 | Schumann ................ | 348/333.1 |
| 2010/0073584 | A1 * | 3/2010 | Harbach et al. .................. | 349/1 |
| 2010/0134761 | A1 * | 6/2010 | Johns et al. .................... | 351/209 |
| 2011/0317015 | A1 * | 12/2011 | Seto et al. ...................... | 348/148 |
| 2014/0148988 | A1 * | 5/2014 | Lathrop et al. ................. | 701/23 |
| 2014/0172231 | A1 * | 6/2014 | Terada et al. ................... | 701/36 |
| 2014/0205143 | A1 * | 7/2014 | Zhang et al. .................. | 382/103 |

* cited by examiner

*Primary Examiner* — Andy Rao
*Assistant Examiner* — Zaihan Jiang
(74) *Attorney, Agent, or Firm* — Cantor Colburn LLP

(57) ABSTRACT

A driver monitoring camera system for a vehicle includes a camera system and an optical beam shaper. The camera system has an exit field of view central axis oriented more vertical than horizontal with respect to a set of orthogonal x, y and z axes, where the z-axis defines a direction line indicative of a vertical direction. The optical beam shaper is disposed in optical communication with the camera system and optically between the camera system and an operator of the vehicle. The optical beam shaper is structurally configured to direct an image of a face of an operator of the vehicle toward the exit field of view of the camera system, and is structurally configured to compress the image in the vertical direction to define a compressed image having a height to width aspect ratio of less an uncompressed height to width aspect ratio of the image.

13 Claims, 3 Drawing Sheets

DRIVER MONITORING CAMERA SYSTEM

FIELD OF THE INVENTION

The subject invention relates to a driver monitoring camera system, and more particularly to a driver monitoring camera system having a low profile that reduces or eliminates obscuration of an instrument panel of an associated vehicle.

BACKGROUND

Driver monitoring systems are designed to transfer an image of a driver's face, or a portion thereof, to a processing circuit that uses facial image recognition type software to ascertain a state of the driver, and to provide an appropriate signal to the driver and/or other vehicle control systems to avoid an unintended consequence that could result from an inattentive driver. The optics for delivery of an image to the driver monitoring system can be large enough to create an obscuration of the instrument panel that the driver relies upon while operating the vehicle. Accordingly, it is desirable to provide a driver monitoring camera system having a low profile that reduces or eliminates obscuration of an instrument panel of an associated vehicle.

SUMMARY OF THE INVENTION

In one exemplary embodiment of the invention a driver monitoring camera system for a vehicle includes a camera system and an optical beam shaper. The camera system has an exit field of view central axis oriented more vertical than horizontal with respect to a set of orthogonal x, y and z axes, where the z-axis defines a direction line indicative of a vertical direction, and the x and y axes define direction lines indicative of horizontal directions. The optical beam shaper is disposed in optical communication with the camera system and optically between the camera system and an operator of the vehicle. The optical beam shaper is structurally configured to direct an image of a face of an operator of the vehicle toward the exit field of view of the camera system, and is structurally configured to compress the image in the vertical direction to define a compressed image having a height to width aspect ratio of less than an uncompressed height to width aspect ratio of the image.

In another exemplary embodiment of the invention a vehicle having a chassis and a steering column operably supported by the chassis is equipped with the aforementioned driver monitoring camera system.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
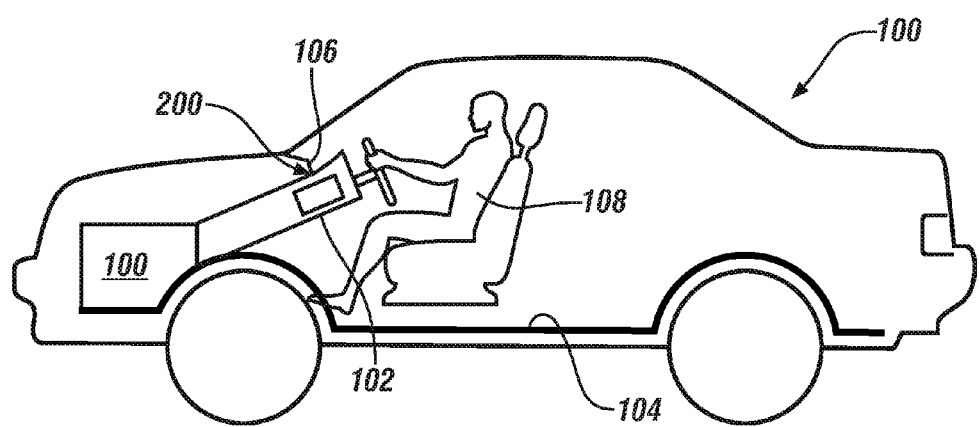
FIG. 1 depicts a block diagram representation of a vehicle for use in accordance with an embodiment of the invention.

The following description is merely exemplary in nature and is not intended to limit the present disclosure, its application or uses. It should be understood that throughout the drawings, corresponding reference numerals indicate like or corresponding parts and features.

Figure 2:
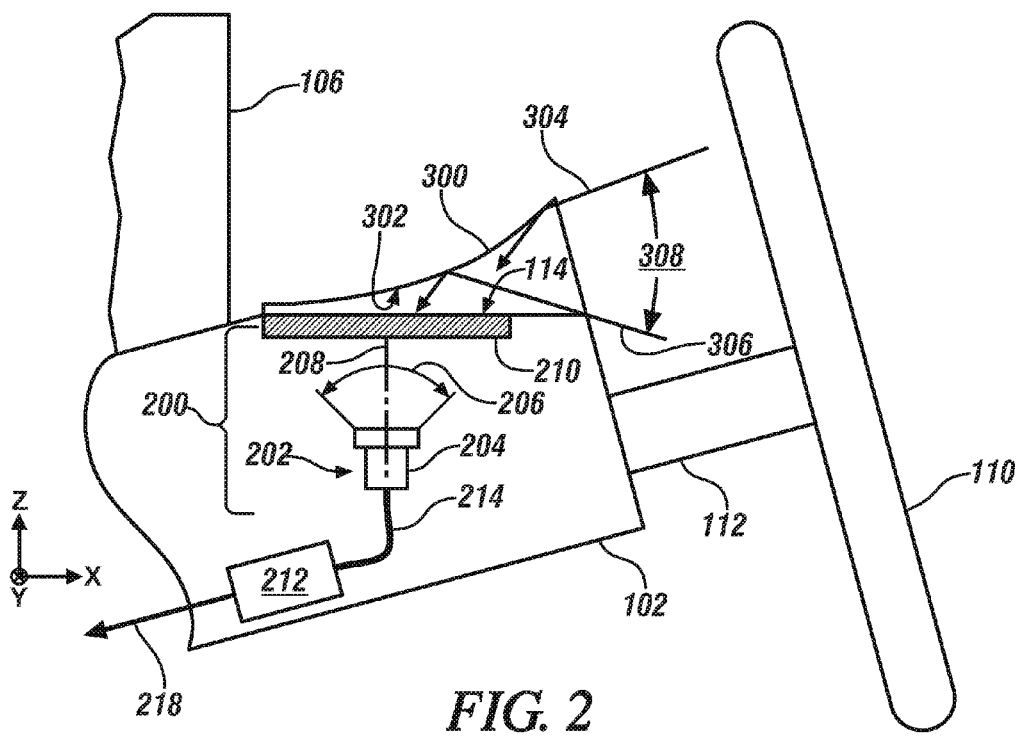
FIG. 2 depicts a driver monitoring camera system in accordance with an embodiment of the invention.

In accordance with an exemplary embodiment of the invention, and with reference to FIGS. 1 and 2, a vehicle 100 having a steering column 102 operably supported by a chassis 104 is equipped with a driver monitoring camera system (DMCS) 200 disposed on or within a steering column 102 with a low profile that substantially or completely eliminates obscuration of the instrument panel 106 of the vehicle 100 from an operator's perspective. A steering wheel 110 is operably connected to the steering column 102 via a shaft 112.

Figure 3:
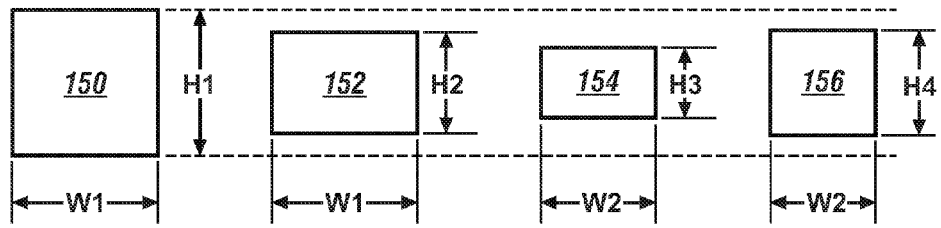
FIG. 3 depicts a series of image representations having different sizes and/or aspect ratios in accordance with an embodiment of the invention.

With reference now to FIG. 2, the DMCS 200 includes a camera system 202 having a camera 204 and an optical beam shaper 300. The camera system 202 has an exit field of view 206 having a central axis 208 oriented more vertical than horizontal with respect to a set of orthogonal x, y and z axes, the z-axis defining a direction line indicative of a vertical direction, the x and y axes defining direction lines indicative of horizontal directions, the y-axis being oriented into the plane of the paper of FIG. 2. The camera system 202 is disposed at least partially within the steering column 102 to give it a low profile appearance. The optical beam shaper 300 is disposed in optical communication with the camera system 202 and optically between the camera system 202 and an operator 108 of the vehicle 100 (best seen with reference to FIG. 1). The optical beam shaper 300 is structurally configured to direct an image of a face of an operator 108 of the vehicle 100 toward the exit field of view 206 of the camera system 202. In an embodiment, and with reference to FIG. 2 in combination with FIG. 3, the optical beam shaper 300 is structurally configured to compress the image of the operator's face 150 in the vertical direction to define a compressed image 152 having a height to width aspect ratio of H2/W1 that is less than the uncompressed height to width aspect ratio H1/W1 of the image of the operator's face 150, which is represented by geometric graphics in FIG. 3, where H2<H1. While squares and rectangles are used to represent an image, uncompressed or compressed, of an operator's face, it will be appreciated that this is for illustration purposes only and that circles and oblongs, or any other suitable shape, could also be used for such representation. As used herein, H1 and W1 represent the uncompressed height and width, respectively, of an operator's face.

Light rays 304, 306 depicted in FIG. 2 represent visible light being reflected off of an operator's face and directed to the optical beam shaper 300. A partial field of view of the optical beam shaper 300 is represented by reference numeral 308.

In an embodiment, the steering column 102 has an opening 114 disposed within the exit field of view 206 of the camera system 202, and an optic 210, which is at least partially transparent, is disposed within the opening 114. In an embodiment, the optic 210 is, or at least includes, a lens (herein also referred to by reference numeral 210) that is structurally configured to transform the compressed image 152 into an alternative modified compressed image 154 or 156, which are different from the compressed image 152, and which are represented by the enumerated geometric graphics in FIG. 3. The modified compressed image 154 has a height to width aspect ratio of H3/W2, where H3<H2 and W2<W1, that forms a smaller version of the compressed image 152 such that H3/W2=H2/W1. The alternative modified compressed image 156 has a height to width aspect ratio of H4/W2 that is equal to the height to width aspect ratio H1/W1 of the operator's face 150, where H4<H1.

By selective design of the optic 210 in combination with the optical beam shaper 300, a compressed image 152 or a modified compressed image 154, 156 having a different height to width aspect ratio or a same height to width aspect ratio as the uncompressed image of the operator's face 150 may be received by the camera system 202 for subsequent processing. In an embodiment having the modified compressed image 156, the optic 210 functionally serves to negate the distortion of the image of the operator's face 150 that results from the optical beam shaper 300 compressing the image 150 in the vertical direction but not the horizontal direction.

In an embodiment, compression of the image of the operator's face 150 in the vertical direction along the z-axis, but not in the horizontal direction along the y-axis, is accomplished by the optical beam shaper 300 having a non-planar reflective surface 302 having a profile structurally configured to compress the image of the operator's face 150 in the vertical direction along the z-axis to define the compressed image 152. In an embodiment, the non-planar reflective surface 302 is a mirror (also herein referred to by reference numeral 302) having a curved reflective surface 302 in the vertical direction along the z-axis, and an optically flat reflective surface in a horizontal direction defined by horizontal surface lines being oriented parallel with the y-z plane. The curvature of the non-planar reflective surface 302 may have a constant radius of curvature or a variable radius of curvature depending on the image characteristics that are suitable for processing, which is discussed further below.

With reference still to FIG. 2, an embodiment of the DMCS 200 includes a processing module 212 operably disposed in signal communication with the camera system 202 via a signal line 214. The processing module 212 is operable to receive data representative of the image of the operator's face 150, such as one of the compressed images 152, 154 or 156, is responsive to executable instructions, such as visual recognition software, which when executed by the processing module 212 defines a state of the image 150, and is operable to produce a signal 218 representative of the state of the image 150. In an embodiment, the state of the image 150 may be a condition where the operator's eyes are not oriented for viewing of the road ahead, a condition where the operator's head is not oriented in a substantially vertical position, or any other condition that could be indicative of the operator of the vehicle 100 possibly being in a driving state that could be considered abnormal for the prevailing driving conditions.

Figure 4:
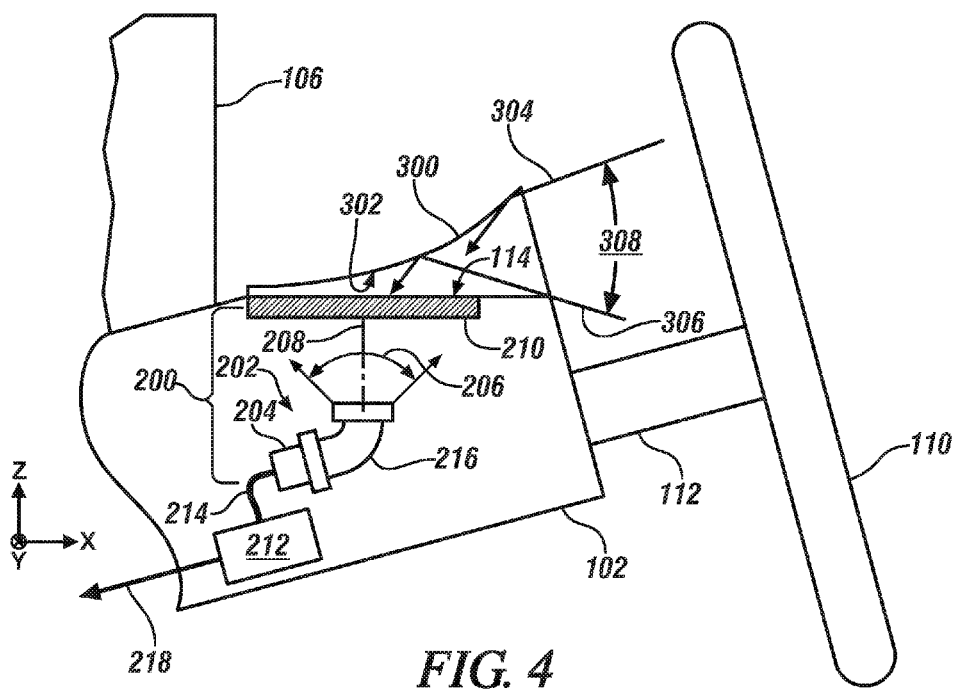
FIG. 4 depicts a driver monitoring camera system alternative to the system depicted in FIG. 2, in accordance with an embodiment of the invention.

With reference now to FIG. 4, an alternative embodiment of the camera system 202 includes an optical waveguide 216 disposed in optical communication with a camera 204, between the camera 204 and the optical beam shaper 300, where the aforementioned exit field of view 206 of the camera system 202 is associated with the optical waveguide 216, as opposed to the camera 204 as depicted in FIG. 2. In the arrangement depicted in FIG. 4, the axis of the camera 204 may be oriented more horizontal, relative to the x-axis, than vertical, relative to the z-axis, while maintaining an exit field of view 206 of the camera system 202 with a central axis 208 oriented more vertical, relative to the z-axis, than horizontal, relative to the x-axis, consistent with the embodiment depicted in FIG. 2. Also consistent with FIG. 2, the y-axis depicted in FIG. 4 is oriented into the plane of the paper.

Figure 5:
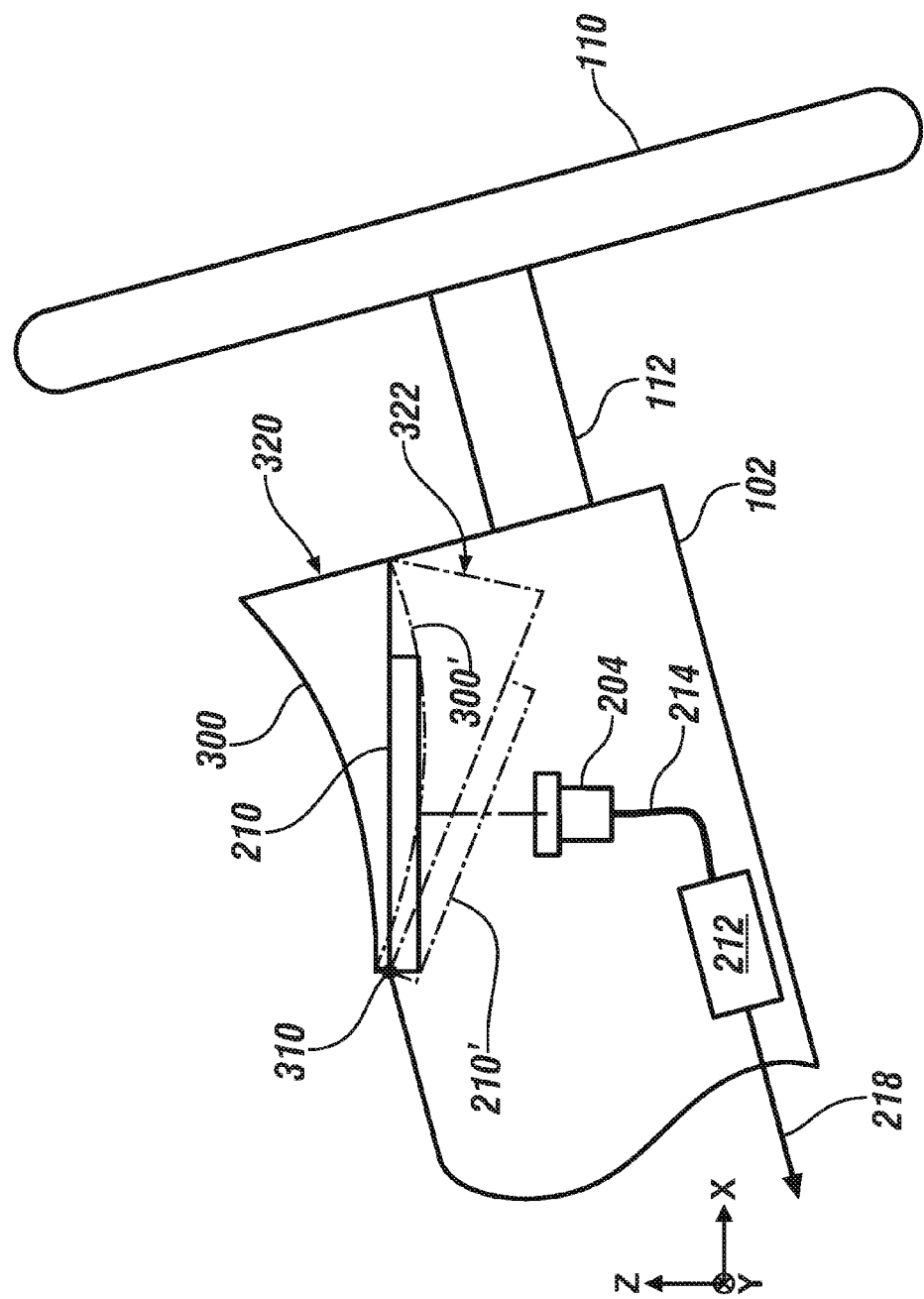
FIG. 5 depicts the driver monitoring camera system of FIG. 2 with the optical beam shaper and optic illustrated by solid lines in an extended position and in dashed lines in a retracted position, in accordance with an embodiment of the invention.

With reference now to FIG. 5 in combination with FIG. 2, an embodiment includes an arrangement where the optical beam shaper 300 and optic 210 are movable from a first extended and operable position 320 (un-primed reference numerals 300, 210 with enumerated features depicted in solid lines) to a second retracted position 322 (primed reference numerals 300', 210' with enumerated features depicted in dashed lines), the first position 320 enabling the optical beam shaper 300 to direct an image 150 of a face of an operator of the vehicle 100 toward the field of view 206 of the camera system 202, and the second position 322 resulting in the optical beam shaper 300' being at least partially disposed within the steering column 102 thereby interfering with the ability of the optical beam shaper 300' to direct an image 150 of a face of an operator of the vehicle 100 toward the field of view 206 of the camera system 202. In an embodiment, the optical beam shaper and optic 300, 210 comprise a hinge 310 operable to permit movement of the optical beam shaper and optic 300, 210 from the first position 320 to the second position 322. From the foregoing, it will be appreciated that a retractable optical beam shaper 300 and optic 210 is equally applicable to the embodiment depicted in FIG. 2 (field of view 206 associated with the camera 204), or the embodiment depicted in FIG. 4 (field of view 206 associated with the optical waveguide 216).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A driver monitoring camera system for a vehicle, the system comprising:

a camera system comprising an exit field of view central axis oriented more vertical than horizontal with respect to a set of orthogonal x, y and z axes, the z-axis defining a direction line indicative of a vertical direction, the x and y axes defining direction lines indicative of horizontal directions, the camera system comprising a camera; and an optical beam shaper disposed in optical communication with the camera system and optically between the camera system and an operator of the vehicle, the optical beam shaper being structurally configured to direct an image of a face of an operator of the vehicle toward the exit field of view of the camera system, the optical beam shaper being structurally configured to compress the image in the vertical direction to define a compressed image having a height to width aspect ratio of less than an uncompressed height to width aspect ratio of the image;
wherein the vehicle comprises a steering wheel operably connected with a steering column, and further wherein the camera system is disposed at least partially within the steering column.

2. The system of claim 1, wherein:
the optical beam shaper comprises a non-planar reflective surface, the non-planar reflective surface comprising a reflective surface profile structurally configured to compress the image in the vertical direction to define the compressed image.

3. The system of claim 2, wherein:
the non-planar reflective surface comprises a mirror comprising a curved reflective surface in the vertical direction, and an optically flat reflective surface in a horizontal direction defined by horizontal surface lines being oriented parallel with the y-z plane.

4. The system of claim 1, wherein the steering column comprises an opening disposed within the exit field of view of the camera system, and further comprising: an optic disposed within the opening, the optic being at least partially transparent.

5. The system of claim 4, wherein the optic comprises a lens structurally configured to transform the compressed image into a modified compressed image that is different from the compressed image.

6. The system of claim 5, wherein the modified compressed image is a smaller version of the compressed image.

7. The system of claim 5, wherein the modified compressed image has a height to width aspect ratio equal to the uncompressed height to width aspect ratio of the image.

8. The system of claim 1, further comprising:
a processing module operably disposed in signal communication with the camera system;
wherein the processing module is operable to receive data representative of the image;
wherein the processing module is responsive to executable instructions which when executed by the processing module defines a state of the image; and
wherein the processing module is operable to produce a signal representative of the state of the image.

9. The system of claim 1, wherein:
the camera system comprises a camera and an optical waveguide disposed in optical communication with the camera, the exit field of view being associated with the optical waveguide.

10. The system of claim 1, wherein:
the optical beam shaper is movable from a first position to a second position, the first position enabling the optical beam shaper to direct an image of a face of an operator of the vehicle toward the field of view of the camera system, the second position interfering with the ability of the optical beam shaper to direct an image of a face of an operator of the vehicle toward the field of view of the camera system.

11. The system of claim 1, wherein: the optical beam shaper is movable from a first operable position to a second retracted position, the optical beam shaper being at least partially disposed within the steering column when in the second retracted position.

12. The system of claim 11, wherein:
the optical beam shaper comprises a hinge operable to permit movement of the optical beam shaper from the first position to the second position.

13. A vehicle, comprising:
a chassis;
a steering column operably supported by the chassis; and
a driver monitoring camera system comprising:
a camera system comprising an exit field of view central axis oriented more vertical than horizontal with respect to a set of orthogonal x, y and z axes, the z-axis defining a direction line indicative of a vertical direction, the x and y axes defining direction lines indicative of horizontal directions, the camera system being disposed at least partially within the steering column; and
an optical beam shaper disposed in optical communication with the camera system and optically between the camera system and an operator of the vehicle, the optical beam shaper being structurally configured to direct an image of a face of an operator of the vehicle toward the exit field of view of the camera system, the optical beam shaper being structurally configured to compress the image in the vertical direction to define a compressed image having a height to width aspect ratio of less than an uncompressed height to width aspect ratio of the image;
wherein the vehicle comprises a steering wheel operably connected with a steering column, and further wherein the camera system is disposed at least partially within the steering column.

* * * * *